(12) United States Patent
Jun

(10) Patent No.: US 8,265,601 B2
(45) Date of Patent: Sep. 11, 2012

(54) METHOD AND APPARATUS FOR TRANSMITTING MESSAGE IN MOBILE COMMUNICATION TERMINAL

(75) Inventor: Jin-Hoon Jun, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 754 days.

(21) Appl. No.: 11/999,500

(22) Filed: Dec. 4, 2007

(65) Prior Publication Data
US 2008/0153462 A1    Jun. 26, 2008

(30) Foreign Application Priority Data
Dec. 4, 2006    (KR) .......................... 10-2006-0121330

(51) Int. Cl.
*H04M 3/42*    (2006.01)
(52) U.S. Cl. .................. 455/412.1; 455/41.2; 455/435.2
(58) Field of Classification Search ............... 455/435.2, 455/41.2, 403, 404.2, 412.1, 412.2, 46, 525, 455/550.1; 370/351, 356
See application file for complete search history.

(56) References Cited

U.S. PATENT DOCUMENTS

| | | | | |
|---|---|---|---|---|
| 6,167,429 A * | 12/2000 | Mercer et al. | ................. | 709/203 |
| 6,233,452 B1 * | 5/2001 | Nishino | .................. | 455/435.2 |
| 6,286,039 B1 * | 9/2001 | Van Horne et al. | .......... | 709/221 |
| 7,304,468 B2 * | 12/2007 | Chung et al. | ............... | 324/76.19 |
| 7,742,768 B2 * | 6/2010 | Liu et al. | ....................... | 455/445 |
| 2004/0203610 A1 * | 10/2004 | Deeds | ........................ | 455/412.1 |
| 2006/0030298 A1 * | 2/2006 | Burton et al. | .............. | 455/412.1 |
| 2007/0112915 A1 * | 5/2007 | Klassen et al. | ................ | 709/206 |
| 2007/0263605 A1 * | 11/2007 | Estevez et al. | ................ | 370/356 |

FOREIGN PATENT DOCUMENTS

| | | |
|---|---|---|
| KR | 1020040070557 | 8/2004 |
| KR | 1020050009597 | 1/2005 |
| KR | 1020050053067 | 6/2005 |
| KR | 1020060070859 | 6/2006 |
| KR | 1020070076725 | 7/2007 |

* cited by examiner

*Primary Examiner* — Cong Tran
(74) *Attorney, Agent, or Firm* — The Farrell Law Firm, P.C.

(57) ABSTRACT

Provided are a method and an apparatus for transmitting a message in a dual mode terminal which supports a mobile communication network and a wireless Internet network. If an event for transmitting the message occurs in a mode supporting the mobile communication network, it is determined whether the wireless Internet network exists in a current position of the dual mode terminal; if it is determined that the wireless Internet network exists in the current position of the dual mode terminal, the mode supporting the mobile communication network is changed into a mode supporting the wireless internet network; and the message is transmitted through the wireless Internet network.

15 Claims, 2 Drawing Sheets

METHOD AND APPARATUS FOR TRANSMITTING MESSAGE IN MOBILE COMMUNICATION TERMINAL

PRIORITY

This application claims priority under 35 U.S.C. §119 to an application entitled "Method and apparatus for transmitting message in mobile communication terminal" filed in the Korean Intellectual Property Office on Dec. 4, 2006 and assigned Serial No. 2006-121330, the contents of which are incorporated herein by reference.

BACKGROUND OF THE INVENTION

1. Field of the Invention

The present invention relates generally to a method and an apparatus for transmitting a message in a mobile communication terminal, and, in particular, to a method and an apparatus for transmitting a message using a wireless Internet module in a dual mode terminal which supports a mobile communication network and a wireless Internet network.

2. Description of the Related Art

Wireless Broadband Internet (WiBro) has been introduced as ultrahigh speed portable Internet service to secure portability and mobility and to allow users to use ultrahigh speed wireless Internet services at low subscription fees. Thus, dual mode terminals have come out to simultaneously support a mobile communication network such as Code Division Multiple Access (CDMA), WideBand CDMA (WCDMA), Personal Communication Services (PCS), Global System for Mobile communication (GSM), etc. as well as WiBro.

In general, such a dual mode terminal, which supports a mobile communication network and a WiBro network, operates in a normal mode in which a signal is transmitted and/or received through the mobile communication network and a WiBro mode in which a signal is transmitted and/or received through the WiBro network. The mobile communication network is realized so as to secure high-speed data services and mobility of the dual mode terminal and to provide a wide coverage area. However, fees to obtain data services provided through the mobile communication network are expensive. In contrast, the WiBro network secures low mobility but provides data services at low fees. Thus, the dual mode terminal supports various services, which are supported in the normal mode, in the WiBro mode so that a user can obtain the various services at low fees. For example, the dual mode terminal provides the user with a function of writing and transmitting a message in the WiBro mode using a Radio Transmission Technology (RTT) program.

However, a method of writing and transmitting a message in the WiBro mode is different from a method of writing and transmitting a message in the normal mode. Thus, users who are familiar with a method of using messages in the normal mode are inconvenienced when using the WiBro mode.

SUMMARY OF THE INVENTION

An aspect of the present invention is to substantially solve at least the above problems and/or disadvantages and to provide at least the advantages below. Accordingly, an aspect of the present invention is to provide a method and an apparatus for transmitting a message in a mobile communication terminal.

Another aspect of the present invention is to provide a method and an apparatus for transmitting a message, which is written in a normal mode using a mobile communication network, through a wireless Internet network in a dual mode terminal which supports the mobile communication network and the wireless Internet network.

The above aspects are achieved by providing a point-to-point emulation apparatus and method in a broadband wireless communication system.

According to one aspect of the present invention, there is provided a method of transmitting a message in a dual mode terminal, which supports a mobile communication network and a wireless Internet network, including, if an event for transmitting the message occurs in a mode supporting the mobile communication network, determining whether the wireless Internet network exists in a current position of the dual mode terminal; if it is determined that the wireless Internet network exists in the current position of the dual mode terminal, changing the mode supporting the mobile communication network into a mode supporting the wireless internet network; and transmitting the message through the wireless Internet network.

According to another aspect of the present invention, there is provided an apparatus for transmitting a message in a dual mode terminal, which supports a mobile communication network and a wireless Internet network, including, if an event for transmitting the message occurs in a mode supporting the mobile communication network, a controller determining whether a wireless Internet network exists in a current position of the dual mode terminal, and if it is determined that the wireless Internet network exists in the current position of the dual mode terminal, changing the mode supporting the mobile communication network into a mode supporting the wireless Internet network to output the message; and a wireless Internet module transmitting the message through the wireless Internet network.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method and an apparatus for transmitting a message, which is written in a normal mode using a mobile communication network, through a wireless Internet network in a dual mode terminal which supports the mobile communication network and the wireless Internet network. Here, the dual mode terminal can support a mobile communication network such as Code Division Multiple Access (CDMA), WideBand CDMA (WCDMA), Personal Communication Services (PCS), Global System for Mobile communication (GSM), etc. It will be described that the dual mode terminal supports a CDMA network as the mobile communication network and a WiBro network as the wireless Internet network. Also, the present invention can be equally applied to a Short Message Service (SMS) message, a Long Messaging Service (LMS) message and a multimedia message, with the SMS message utilized as an example of the message in the following description.

Figure 1:
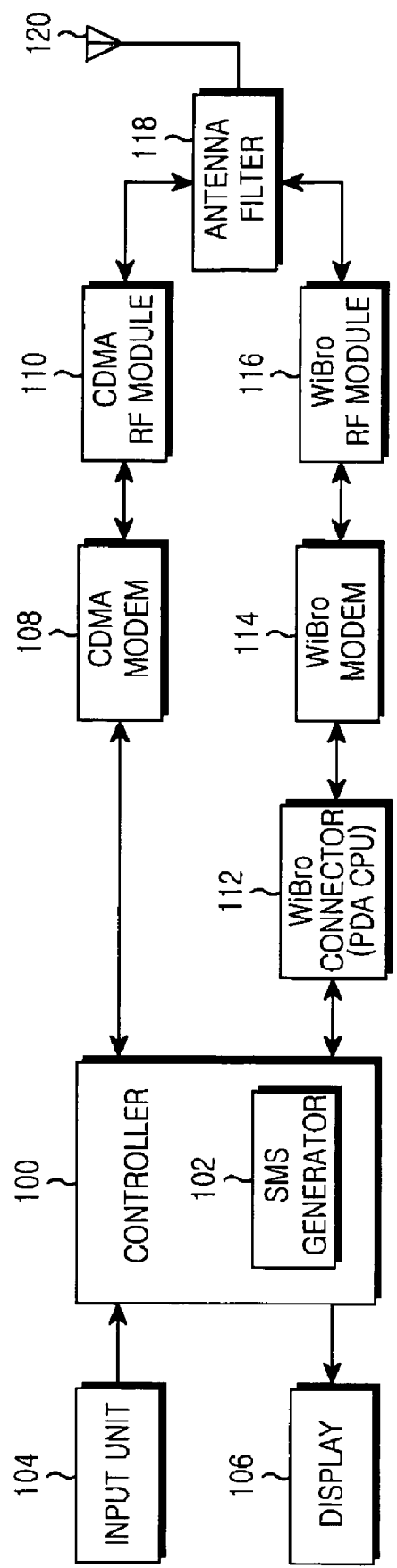
FIG. 1 is a block diagram of a mobile communication terminal according to the present invention.

FIG. 1 is a block diagram of a mobile communication terminal according to the present invention. Referring to FIG. 1, the mobile communication terminal includes a controller 100 having an SMS generator 102, an input unit 104, a display 106, a CDMA modem 108, a CDMA Radio Frequency (CDMA RF) module 110, a WiBro connector 112, a WiBro modem 114, a WiBro RF module 116, an antenna filter 118 and an antenna 120.

The controller 100 controls an overall operation of the mobile communication terminal, e.g., processes and controls operations for performing voice and data communications. In particular, according to the present invention, if an event for transmitting a SMS message occurs in a normal mode in which a signal is transmitted and/or received using a CDMA network, the controller 100 controls and processes functions of searching a WiBro network and transmitting the SMS message through the WiBro network. In other words, if a SMS message transmission event occurs in a normal mode in which a signal is transmitted and/or received through the CDMA modem 108 and the CDMA RF module 110, the controller 100 determines whether the WiBro RF module 116 has received a WiBro signal. If it is determined that the WiBro RF module 116 has not received the WiBro signal, the controller 100 outputs the SMS message generated by the SMS generator 102 to the CDMA modem 108 so as to transmit the SMS message to a corresponding terminal through the CDMA network. If it is determined that the WiBro RF module 116 has received the WiBro signal, the controller 100 activates a WiBro mode to transmit the SMS message to the corresponding terminal through the WiBro network and then outputs an Internet Protocol (IP) address preset by a user and the SMS message generated by the SMS generator 102 to the WiBro connector 112.

The input unit 104 includes a plurality of function keys to provide the controller 100 with data corresponding to a key input by the user. The display 106 displays state information and limited numerical characters generated during the operation of the mobile communication terminal.

The CDMA modem 108 processes a CDMA signal received from the CDMA RF module 110 and a call generated according to a protocol defined in CDMA standards. The CDMA RF module 110 demodulates the CDMA signal input from the antenna filter 118, outputs the demodulated CDMA signal to the CDMA modem 108, modulates transmission data input from the CDMA modem 108, and outputs the modulated transmission data through the antenna 120.

The WiBro connector 112 connects the controller 100 to the WiBro modem 114 in order to output a signal input from the controller 100 to the WiBro modem 114 and a signal input from the WiBro modem 114 to the controller 100. The connection between the controller 100 and the WiBro modem 114 through the WiBro connector 112 is performed because the WiBro modem 114 does not include an additional operating system. Here, the WiBro connector 112 is preferably a Central Processing Unit (CPU) used in a Personal Digital Assistant (PDA). Here, although not shown in FIG. 1, Dual Port Random Access Memories (DPRAM) are preferably installed between the WiBro connector 112 and the controller 100 and between the WiBro connector 112 and the WiBro modem 114 so as to adjust levels of input and output signals.

The WiBro modem 114 processes a WiBro signal received from the WiBro RF module 116 and a call according to a protocol defined in WiBro standards. In particular, according to the present invention, the WiBro modem 114 processes functions of receiving the IP address and the SMS message and transmitting the SMS message to the corresponding terminal using the IP address. The WiBro RF module 116 demodulates the WiBro signal input from the antenna filter 118, outputs the demodulated WiBro signal to the WiBro modem 114, demodulates the transmission data input from the WiBro modem 114, and outputs the modulated transmission data through the antenna 120.

The antenna filter 118 divides an RF signal input from the antenna 120 into the CDMA and WiBro signals and outputs the CDMA signal to the CDMA RF module 110 and the WiBro signal to the WiBro RF module 116. Here, the CDMA signal is a signal corresponding to a frequency band of 800 MHz, and the WiBro signal is a signal corresponding to a frequency band of 2.3 GHz. Also, the antenna filter 118 outputs signals input from the CDMA RF module 110 and the WiBro RF module 116 to the antenna 120. The antenna 120 receives an RF signal transmitted from a neighboring wireless Base Station (BS) and transmits the RF signal input from the antenna filter 118 in order to transmit and receive the CDMA and WiBro signals.

Figure 2:
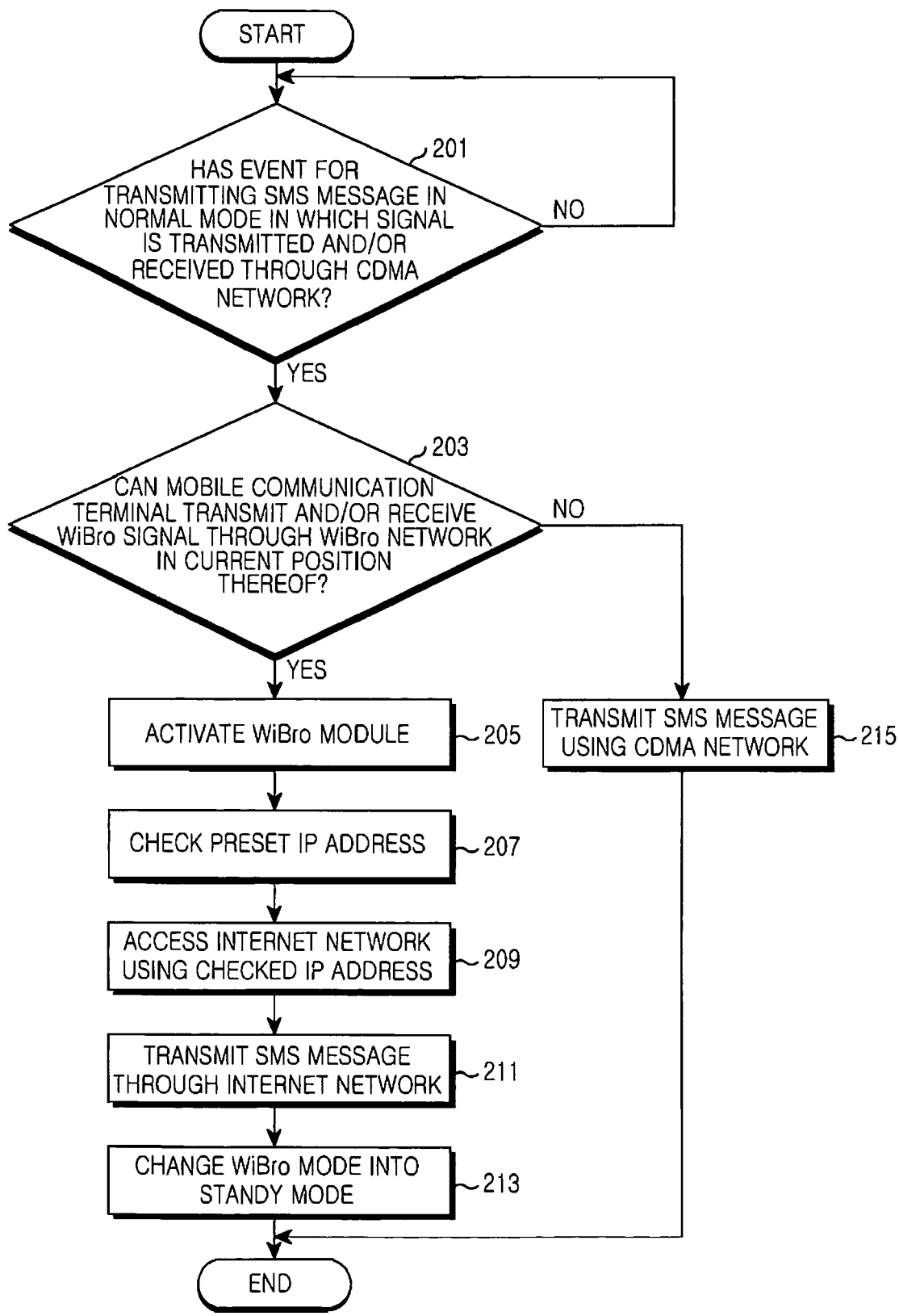
FIG. 2 is a flowchart of a method of transmitting a Short Message Service (SMS) message in a mobile communication terminal according to the present invention.

FIG. 2 is a flowchart of a method of transmitting an SMS message in a mobile communication terminal according to the present invention. Referring to FIG. 2, in step 201, the mobile communication terminal determines whether an event for transmitting an SMS message has occurred in a normal mode in which a signal is transmitted and/or received through a CDMA network. If it is determined in step 201 that the event has occurred in the normal mode, in step 203, the mobile communication terminal determines whether the mobile communication terminal can transmit and/or receive a WiBro signal through a WiBro network in a current position thereof.

If it is determined in step 203 that the mobile communication terminal cannot transmit and/or receive the WiBro signal through the WiBro network in the current position thereof, the mobile communication terminal goes to step 215 to transmit the SMS message through the CDMA network and then ends the present process.

If it is determined in step 203 that the mobile communication terminal can transmit and/or receive the WiBro signal through the WiBro network in the current location of the mobile communication terminal, the mobile communication terminal proceeds to step 205 to change the normal mode into a WiBro mode in which a signal is transmitted and/or received through the WiBro network, to activate a Wibro module. In step 207, the mobile communication terminal checks an Internet address preset by a user, i.e., an IP address. Here, if the Internet address is not preset by the user, the mobile communication terminal requests an input of an Internet address of the user or checks an Internet address preset in the mobile communication terminal.

In step 209, the mobile communication terminal accesses an Internet network using the checked IP address. In step 211, the mobile communication terminal transmits the SMS message through the Internet network. In step 213, the mobile communication terminal changes the activated WiBro mode into a standby mode and then ends the present process.

In the above-described method, an SMS message is transmitted using an Internet address input from a user or preset in the mobile communication terminal. However, if a common carrier generates an Internet address for transmitting and/or receiving an SMS message, the SMS message may be transmitted using the generated Internet address.

In accordance with the present invention as described above, a dual mode terminal, which supports a mobile communication network and a wireless Internet network, can transmit an SMS message through the wireless Internet network in a normal mode in which a signal is transmitted and/or received using the mobile communication network. Thus, the dual mode terminal can transmit the SMS message using a message function in the normal mode at lower fees without entering a mode using the wireless Internet network to write the SMS message.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting a message in a dual mode terminal, which supports a mobile communication network and a wireless Internet network, the method comprising:
   determining whether an event for transmitting a message has occurred in a normal mode supporting the mobile communication network;
   writing the message in the normal mode supporting the mobile communication network;
   determining whether the wireless Internet network exists in a current position of the dual mode terminal if the event for transmitting a message has occurred in the normal mode;
   changing a mode supporting the mobile communication network into a mode supporting the wireless Internet network if the wireless Internet network exists in the current position of the dual mode terminal; and
   transmitting the message written in the normal mode through the wireless Internet network.

2. The method of claim 1, wherein if the wireless Internet network does not exist in the current position of the dual mode terminal, the message is transmitted through the mobile communication network.

3. The method of claim 1, further comprising, after transmitting the message, changing the mode supporting the wireless Internet network into a mode supporting the mobile communication network.

4. The method of claim 1, wherein the message is one of a Short Message Service (SMS) message, a Long Messaging Service (LMS) message, and a multimedia message.

5. The method of claim 1, wherein the wireless Internet network is a Wireless Broadband Internet (WiBro) network.

6. The method of claim 1, wherein the transmission of the message comprises:
   checking a preset Internet Protocol (IP) address; and
   accessing the wireless Internet network using the preset IP address to transmit the message through the wireless Internet network.

7. The method of claim 6, further comprising, if the IP address is not preset, requesting an input of an IP address by a user.

8. An apparatus for transmitting a message in a dual mode terminal, which supports a mobile communication network and a wireless Internet network, the apparatus comprising:
   a controller determining whether an event for transmitting a message has occurred in a normal mode supporting the mobile communication network, and if the event for transmitting a message has occurred in the normal mode, writing the message in the normal mode supporting the mobile communication network, determining whether a wireless Internet network exists in a current position of the dual mode terminal, and if the wireless Internet network exists in the current position of the dual mode terminal, changing a mode supporting the mobile communication network into a mode supporting the wireless Internet network to output the message; and
   a wireless Internet module transmitting the message written in the normal mode through the wireless Internet network.

9. The apparatus of claim 8, further comprising a wireless Internet connector which connects the controller to the wireless Internet module.

10. The apparatus of claim 9, wherein the wireless Internet connector is a Central Processing Unit (CPU) used in a Personal Digital Assistant (PDA).

11. The apparatus of claim 8, wherein after the message is transmitted, the controller changes the mode supporting the wireless Internet network into a mode supporting the mobile communication network.

12. The apparatus of claim 8, wherein the message is one of an SMS message, an LMS message and a multimedia message.

13. The apparatus of claim 8, wherein the wireless Internet network is a WiBro network.

14. The apparatus of claim 8, wherein the wireless Internet module accesses the wireless Internet network using a preset IP address to transmit the message through the wireless Internet network.

15. A non-transitory computer-readable recording medium having recorded thereon a program for transmitting a message in a dual mode terminal, which supports a mobile communication network and a wireless Internet network, comprising:
   a first code segment, for determining whether an event for transmitting a message has occurred in a normal mode supporting the mobile communication network;
   a second code segment, for writing the message in the normal mode supporting the mobile communication network;
   a third code segment for determining whether the wireless Internet network exists in a current position of the dual mode terminal if the event for transmitting a message has occurred in the normal mode;
   a fourth code segment, for changing a mode supporting the mobile communication network into a mode supporting the wireless Internet network if the wireless Internet network exists in the current position of the dual mode terminal; and
   a fifth code segment, for transmitting the message written in the normal mode through the wireless Internet network.

* * * * *